(12) United States Patent
Hellemans et al.

(10) Patent No.: US 11,975,288 B2
(45) Date of Patent: May 7, 2024

(54) STATIC DRYER

(71) Applicant: ATLAS COPCO AIRPOWER, NAAMLOZE VENNOOTSCHAP, Wilrijk (BE)

(72) Inventors: Geert Hellemans, Wilrijk (BE); Thibault Crepain, Wilrijk (BE); Frederik Van Nederkassel, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 424 days.

(21) Appl. No.: 17/607,527

(22) PCT Filed: Sep. 12, 2019

(86) PCT No.: PCT/IB2019/057707
§ 371 (c)(1),
(2) Date: Oct. 29, 2021

(87) PCT Pub. No.: WO2020/250028
PCT Pub. Date: Dec. 17, 2020

(65) Prior Publication Data
US 2022/0212137 A1 Jul. 7, 2022

(30) Foreign Application Priority Data
Jun. 13, 2019 (BE) .................................. 2019/5382

(51) Int. Cl.
*B01D 53/02* (2006.01)
*B01D 53/06* (2006.01)
(Continued)

(52) U.S. Cl.
CPC ........... *B01D 53/06* (2013.01); *B01D 53/261* (2013.01); *F24F 3/1423* (2013.01); *B01D 2257/80* (2013.01); *B01D 2259/4009* (2013.01)

(58) Field of Classification Search
CPC ........ B01D 2257/80; B01D 2259/4009; B01D 53/0446; B01D 53/06; B01D 53/261;
(Continued)

(56) References Cited

U.S. PATENT DOCUMENTS 3,176,446 A * 4/1965 Siggelin ................ F24F 3/1423
55/423
4,269,611 A 5/1981 Anderberg
(Continued)

FOREIGN PATENT DOCUMENTS

BE 2016/5804 A1 2/2018
DE 2512065 A1 9/1976
(Continued)

OTHER PUBLICATIONS

International Search Report and Written Opinion in corresponding PCT Application No. PCT/IB2019/057707, dated Feb. 24, 2020.
(Continued)

*Primary Examiner* — Christopher P Jones
(74) *Attorney, Agent, or Firm* — BACON & THOMAS, PLLC

(57) ABSTRACT

Drying device including a drying medium with a predetermined number of drying segments which extend adjacently of each other and are associated with at least one opening at each of a first connecting end and a second connecting end, wherein the predetermined number is greater than six and wherein each connecting end includes first and second complementary concentric elements which are rotatable relative to each other round an axis. The openings are provided in the first concentric elements along a rotation
(Continued)

ring around the axis. The second concentric elements each delimit at least two channels which open at the position of said rotation ring, so that corresponding channels of the first and second connecting end are connected to each other via the openings and the drying segments in order to allow a first airflow and a second airflow through the drying device.

17 Claims, 12 Drawing Sheets

(51) Int. Cl.
  *B01D 53/26* (2006.01)
  *F24F 3/14* (2006.01)
(58) Field of Classification Search
  CPC ............. B01D 2258/06; B01D 53/26; F24F 2003/144; F24F 2203/1012; F24F 2203/1036; F24F 2203/108; F24F 3/1423
  See application file for complete search history.

(56) References Cited

U.S. PATENT DOCUMENTS

| | | | | |
|---|---|---|---|---|
| 4,701,189 A | * | 10/1987 | Oliker | B01D 53/06 95/123 |
| 5,017,202 A | | 5/1991 | Ogata et al. | |
| 5,727,394 A | * | 3/1998 | Belding | F24F 1/0043 62/304 |
| 5,732,562 A | * | 3/1998 | Moratalla | F24F 5/001 62/271 |
| 6,358,303 B1 | | 3/2002 | Maekawa | |
| 7,077,187 B2 | | 7/2006 | Cargnelli et al. | |
| 9,446,343 B2 | * | 9/2016 | Elliott | B01D 53/06 |
| 9,539,540 B2 | * | 1/2017 | Elliott | B01D 53/08 |
| 2010/0043633 A1 | * | 2/2010 | Galbraith | B01D 53/0462 422/186.04 |
| 2010/0329949 A1 | * | 12/2010 | Yuan | B01J 8/0278 422/236 |

FOREIGN PATENT DOCUMENTS

| | | |
|---|---|---|
| EP | 1140325 A1 | 10/2001 |
| EP | 1508359 A1 | 2/2005 |
| FR | 2376684 A1 | 8/1978 |
| JP | 5068209 B2 | 11/2012 |
| JP | 5626528 B2 | 11/2014 |
| RU | 2336434 C2 | 10/2005 |
| RU | 2516675 C1 | 5/2014 |

OTHER PUBLICATIONS

BE Search Report in corresponding BE Application No. 201905382, dated Feb. 12, 2020.

Japanese Office Action in corresponding Japanese Application No. 2021-570942, dated Mar. 27, 2023.

Russian Search Report in corresponding Russian Application No. 2022100042/12, dated Jan. 18, 2023.

* cited by examiner

STATIC DRYER

The invention relates to a drying device for drying compressed gas.

BACKGROUND OF THE INVENTION

BE2016/5804 describes a drying device for drying compressed gas. This document describes how efficient use can be made of the heat of the compressed gas coming from a compressor element. This manner of connecting allows the compressed gas to be carried through the drying installation both as regeneration air flow and as drying air flow. The drying installation is a continuous drying installation which has the feature that dry air is carried through part of the drying medium, while regeneration air is carried through another part of the drying medium. The position where the regeneration air and the drying air flow through the medium changes almost continuously. Provided in BE2016/5804 is a cylindrical drying medium which rotates through substantially statically positioned airflows. Sections of the drying medium, which rotate around an axis, will hereby find their way successively into the regeneration air flow and the drying air flow. This is referred to in practice as a rotation dryer.

EP 1 140 325 describes a drying device in which a substantially cylindrical drying medium is fixedly placed. Means for separating the gas flows are provided rotatably above and below the drying medium. In this way a drying device is obtained in which the same relative rotating movement is performed between the drying medium and the airflows as in the above described rotation dryer. The difference is that this document describes that the drying medium is stationary, while airflows rotate in that the means for separating the airflows rotate.

U.S. Pat. No. 7,077,187 describes an alternative device in which the drying medium has three cavities. These cavities are mutually separated by a wall. The three cavities are connected at the position of their first and second end by three air chambers. An air distributing element is placed centrally between the three air chambers. The air distributing element can rotate, whereby the cavities are alternately provided with a regeneration air flow and a drying air flow.

SUMMARY OF THE INVENTION

It is an object of the invention to provide a drying device whereby an optimal distribution between the drying air flow and the regeneration air flow can be obtained and wherein the drying device can be manufactured in cheaper and more low-maintenance manner.

The invention provides for this purpose a drying device comprising a drying medium with a predetermined number of drying segments which extend adjacently of each other and are associated with at least one opening at each of a first connecting end and second connecting end, wherein the predetermined number is greater than six and wherein each connecting end comprises first and second complementary concentric elements which are rotatable relative to each other round an axis, wherein the openings are provided in first concentric elements along a rotation ring around the axis, wherein the second concentric elements each delimit at least two channels which open at the position of said rotation ring, so that corresponding channels of the first and second connecting end are connected to each other via the openings and the drying segments in order to allow a first airflow and a second airflow through the drying device.

The invention is based on the insight that when the number of drying segments is greater than six, the ratio between the regeneration air flow and the drying air flow can be optimized. More specifically, a greater volume segment of the total drying medium can be used to allow drying air to flow. A smaller volume segment of the drying medium can then be used for letting regeneration air flow. Hereby, the drying medium is used more optimally and the efficiency of the drying device also increases.

The invention is further based on the insight that connecting a drying drum to an air distributing element in a traditional manner, wherein a relative movement between the drying drum and the air element is made possible, results in a complex construction and more expensive drying device which is more difficult to maintain. By associating the drying segments with openings which are provided on complementary concentric elements the air can be distributed via the channels, delimited by second concentric elements, to the openings in first concentric elements. This is a considerably simpler construction which can be realized more cheaply and is less susceptible to wear. Such a construction is also easier to maintain. The drying device according to the invention is thereby more efficient, cheaper and easier to maintain than known drying devices.

Preferably formed in each of the second concentric elements is at least a first channel which opens at the position of said rotation ring onto a first selection of the openings in order to allow the first airflow through the first channel and the associated segments. By forming the first channel in each of the second concentric elements this first channel can be connected in simple manner for carrying an external airflow through the first channel By rotation of the second concentric elements the associated segments, i.e. the segments associated with the openings of the first selection, onto which the channel opens can change. A first airflow and a second airflow can hereby flow alternately through one segment.

Each of the second concentric elements is preferably further formed so as to leave a second selection of the openings, differing from the first selection, open in order to delimit a second channel around the second concentric elements to allow the second airflow through the second channel and the associated segments. By leaving openings of the second selection open, the first channel can be delimited from the second channel in simple manner. More specifically, the first channel extends in, through the second concentric elements while the second channel is situated around, about the second concentric elements. The second channel can be connected by providing the housing, around the second concentric elements, with an airflow, while the first channel is connected by connecting the second concentric elements.

Each stated at least one opening preferably comprises a first opening provided along the rotation ring and a second opening provided along a further rotation ring, wherein the second concentric elements are formed to cover the second openings where a first channel opens onto the first openings 8 and to leave the second openings open where the first openings are covered. Providing a first opening and a second opening at each segment provides the option of connecting the first airflow via the first openings and connecting the second airflow via the second openings. This considerably increases the freedom of design of the concentric elements. Resistance to air flow is also reduced.

The openings preferably have a substantially constant size and the openings are preferably situated at a substantially constant intermediate distance from each other along the rotation ring. Because of the substantially constant size and the substantially constant intermediate distance air can be carried via the channels to the openings in optimal manner. Rotation of the channels relative to the openings will also have a predictable effect which is independent of the angular position of the concentric elements relative to each other.

The drying segments and first concentric elements are preferably provided statically in the drying device and the second concentric elements are preferably rotatable in the drying device. By providing the drying segments statically, the drying medium is also provided statically. By providing the drying segments and the first concentric elements statically, most and the largest operating elements of the drying device are therefore fixed. Fixed construction of a drying device is considerably simpler than when a substantial number of components or when large components have to be provided rotatably. The drying device can hereby be manufactured more cheaply and reliably.

The predetermined number is preferably smaller than 50, more preferably smaller than 40, most preferably smaller than 30, and the predetermined number is preferably greater than 10, more preferably greater than 15, and most preferably greater than 20. Tests have shown that the optimal number of drying segments is about 25. By increasing the number of drying segments the ratio of the drying air flow relative to the regeneration air flow can be determined more precisely. With such a number of drying segments it also becomes possible to have a third airflow, for instance a cooling air flow, flow through the drying medium.

The complementary concentric elements have a surface area in a cross-section transversely of the axis which can be considerably smaller than the surface area of the drying medium in a cross-section transversely of the axis. In other words, it is possible to form the drying device such that the concentric elements which provide for the distribution of the air are considerably smaller than the drying medium in which the air is distributed itself. This considerably reduces the relative movement of components relative to each other for distribution of the air.

An air chamber is preferably provided between the openings and the drying medium, so that air flowing through the openings can be distributed uniformly in the drying medium. In other words, the air chamber bridges the small surface area of the concentric elements and the large surface area of the drying medium. This allows air to flow radially between the openings on the one side and the drying medium on the other.

The second concentric elements are preferably operatively connected for rotating synchronously relative to the first concentric elements. The operative connection is preferably formed by a shaft which physically connects the second concentric elements to each other. Because of the physical connection the concentric elements will always move synchronously, whereby the channels on either side of the drying medium are positioned correspondingly so as to allow the two airflows to flow through the segments of the drying medium. Because of the synchronous rotation, successive segments which are associated with at least one opening can alternately be used both at the first and the second connecting end for the first airflow and the second airflow. As an alternative to a mechanical connection it is also possible to provide an electrical, electronic or hydraulic operative connection, such that the second concentric elements can be driven synchronously.

The two channels are preferably provided for allowing the first airflow to flow through X segments and for allowing the second airflow to flow through Y segments, wherein X is greater than Y. X is preferably greater than 1.5 times Y, X is more preferably greater than 2 times Y. X is preferably smaller than 5 times Y. Tests have shown that such a ratio between the drying air flow and regeneration air flow is optimal for a dryer and allows an efficient operation.

The drying device is preferably provided for allowing the first airflow and the second airflow in opposite directions. This allows an efficient construction of the drying device.

The device is preferably formed to allow a third airflow which extends between an end of the first airflow on the one side and an end of the second airflow on the other. The first airflow forms the drying air flow and the second airflow forms the regeneration air flow. The dried air is typically also cooled. This cooled and dried air can be partially used as cooling air. The channels can for this purpose be formed such that not all dried air is discharged, but a small part of the dried air is fed back into at least one segment as cooling air. This cooling air then typically flows parallel and adjacent to the regeneration air and can be collected on the other side of the drying device along with the regeneration air flow. The primary function of the cooling air is to provide for cooling. Secondly, the cooling air can also have other effects. The two channels are preferably provided for allowing the third airflow to flow through Z segments, wherein Z is smaller than Y. Z preferably represents a maximum of 10% of the total number of segments, more preferably a maximum of 5%.

The invention further relates to a compressor for compressing a gas, which compressor is provided with at least one compressor element with an outlet for compressed gas, wherein said outlet for compressed gas is connected to the drying device according to any one of the foregoing claims. The compressor produces dried compressed gas with the above described advantages of the drying device.

The invention will now be further described on the basis of exemplary embodiments shown in the drawings.

DETAILED DESCRIPTION OF THE INVENTION

Figure 1A:
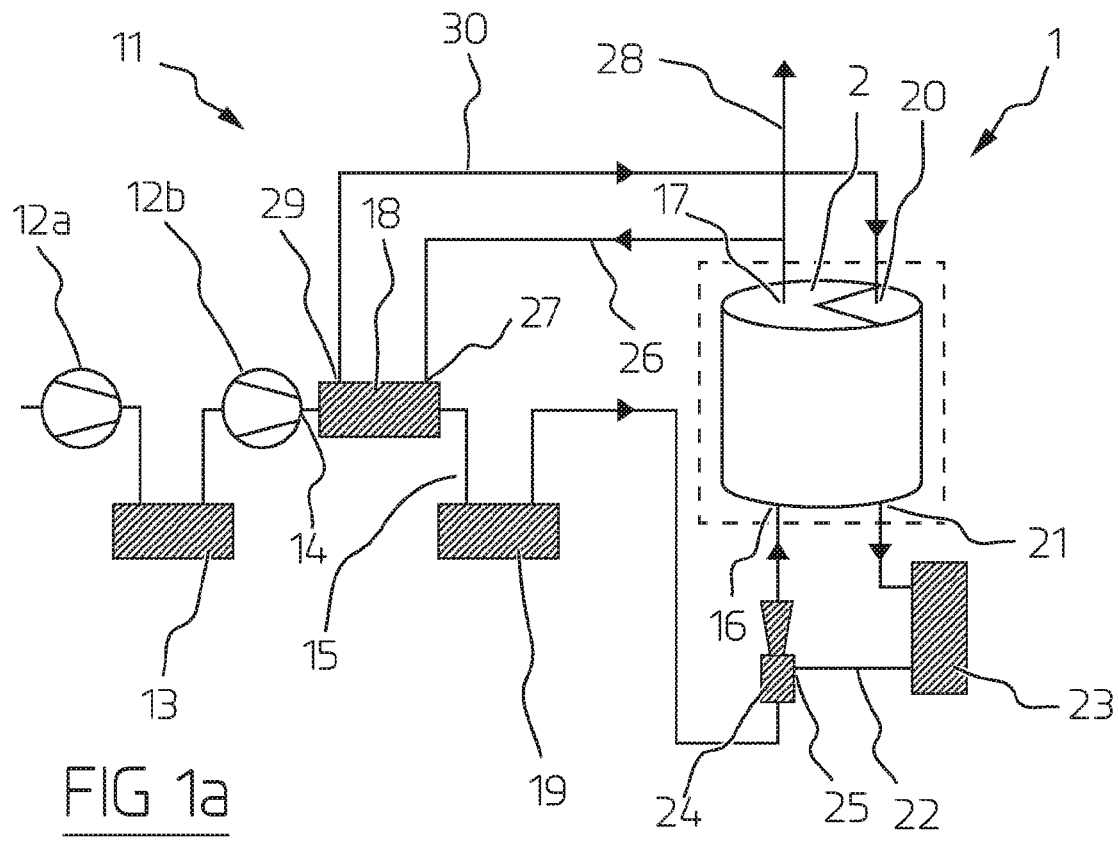
FIG. 1A shows a schematic view of a compressor with a prior art drying device which is connected to a compressor element.

The same or similar elements are designated in the drawings with the same reference numerals.

FIG. 1A shows a first embodiment of a compressor installation 11 according to the invention, which in this case comprises two compressor elements 12a and 12b. The invention is however not limited thereto, and a compressor installation 11 according to the invention can also comprise one or more than two compressor elements 12a and 12b.

Compressor elements 12a and 12b are connected to drive means, not shown in the figure, for instance in the form of one or more motors, turbines, sprocket wheels or the like.

Compressor elements 12a and 12b in this case form a first, low-pressure stage 12a and a second, high-pressure stage 12b lying downstream thereof. An intercooler 13 is preferably provided in the connecting conduit between the relevant compressor elements 12a and 12b.

The high-pressure compressor 12b is provided with an outlet 14 for compressed gas to which a first outer end of a pressure conduit 15 is connected.

Compressor installation 11 according to the invention further comprises a drying device 1 for compressed gas, which drying device 1 comprises a housing in which a drying medium 2 is situated. A drying air flow and a regeneration air flow are carried through this drying medium. In the figure the drying air flow runs through drying medium 2 from a first inlet 16 to a first outlet 17. The first outlet 17 typically lies on the opposite end relative to first inlet 16. Said pressure conduit 15 is connected with its second outer end to said first inlet 16 for compressed gas for drying.

Said pressure conduit 15 can comprise a heat exchanger 18 for heating regeneration air, whereby heat exchanger 18 also partially provides for the cooling of compressed gas flowing from the high-pressure compressor element 12b to the first inlet 16 of drying device 1. The configuration of said heat exchanger 18 is thus such that the cooling takes place before the compressed gas coming from the high-pressure compressor element 12b enters drying device 1.

Also provided in pressure conduit 15 in this case is an aftercooler 19 which is preferably arranged downstream of said heat exchanger 18, i.e. in the flow direction of the compressed gas, between this heat exchanger 18 and said first inlet 16 of the drying device.

The drying device and the operation thereof are described in more detail below with reference to the following figures. The drying device comprises a drying medium 2 with a regenerable drying agent or so-called desiccant material, such as for instance silica gel granules, activated alumina or molecular sieve material, or a combination thereof. The drying agent can of course also be embodied in other ways.

In the figure said regeneration air flow runs from a second inlet 20 for supply of a regeneration gas and from a second outlet 21, lying opposite, for discharge of used regeneration gas. Used regeneration gas is understood to mean gas which, after passing through drying medium 2, is contaminated with moisture extracted therefrom.

Connected to said first outlet 17 of drying device 1 is an outlet conduit 28 for removing dried, compressed gas to a user (not shown in the figure), for instance in the form of a compressed air system, a pressure vessel or a machine or tool which makes use of compressed gas.

According to the invention, a first branch conduit 26 which is connected to a cooling inlet 27 of said heat exchanger 18 is connected to said outlet conduit 28, while said heat exchanger 18 further comprises a cooling outlet 29 which is connected via a second regeneration conduit 30 to said second inlet 20 of drying device 1.

The relevant cooling inlet 27 and cooling outlet 29 in this case form part of a secondary portion of heat exchanger 18, the primary portion of which is configured for leading the compressed gas for drying through.

Second outlet 21 of drying device 1 is connected via a return conduit 22 to said pressure conduit 15 at a point downstream of said heat exchanger 18, and in this case on the part of pressure conduit 15 which connects aftercooler 19 to the first inlet 16 of drying zone 8.

Also provided in return conduit 22 in this embodiment is an additional cooler 23 and a condensate separator, which may or may not be accommodated in the same housing as the cooling portion of cooler 23 and is not shown in FIG. 1A.

In the embodiment of FIG. 1A the connection between return conduit 22 and pressure conduit 15 is realized by means of a venturi 24 arranged in pressure conduit 15 and provided with a suction opening 25 to which the above stated return conduit 22 is connected.

The operation of a compressor installation 11 according to FIG. 1A is very simple, and as follows. The low-pressure stage 12a draws in a gas or mixture of gases, such as for instance air, for compressing. Part of the resulting heat of compression is then discharged by means of intercooler 13.

After leaving intercooler 13, the compressed gas flows to the high-pressure stage 12b, where it is compressed further, and then to the primary portion of heat exchanger 18. In the relevant heat exchanger 18, which functions at least partially as gas-gas heat exchanger, heat of compression is transferred to the gas which enters heat exchanger 18 via cooling inlet 27 and leaves the heat exchanger again via cooling outlet 29.

It will be apparent that heat exchanger 18 is constructed such that the gas flowing through pressure conduit 15 is not mixed with the gas which is guided as cooling gas through the secondary side of heat exchanger 18. In this case heat exchanger 18 is configured such that the two gas flows flowing therethrough flow in mutual counterflow, although this is not a strict requirement according to the invention.

The pre-cooled, compressed gas which leaves heat exchanger 18 and flows on via pressure conduit 15 then comes to lie in the aftercooler, where yet a further cooling of this gas flow takes place.

After this, the cold, compressed gas flows via venturi 24 and first inlet 16 through drying device 1, where the moisture present in the gas is absorbed by the drying agent present in drying medium 2.

Cold, dry, compressed gas then leaves drying device 1 via first outlet 17 and flows via outlet conduit 28 to the user of compressed gas.

According to the invention, part of the cold, dried, compressed gas is tapped off from outlet conduit 28 and then carried via first branch conduit 18 to the secondary portion of heat exchanger 18 and more specifically to the above stated cooling inlet 27 so as to serve as cooling medium there.

When the gas leaves cooling outlet 29, the temperature thereof has increased due to absorption of the heat of compression generated in the high-pressure compressor element 12b. The relative humidity of the gas tapped off via branch conduit 26 will hereby decrease still further in a very energy-efficient manner.

Finally, the extra dry gas which flows through regeneration conduit 30 is carried via a second inlet 20 as regeneration air through drying device 1, where this gas serves as regeneration gas which will extract moisture from drying medium 2.

After the regeneration gas has left the regeneration zone via second outlet 21 it will flow via the additional cooler 23 and the condensate separator provided downstream thereof, which can optionally, though not necessarily, be integrated in the same housing as that of cooler 23, to the suction opening 25 of venturi 24.

According to the invention, the presence of a venturi is not strictly necessary, and use can also be made of for instance a blower for combining the regeneration gas which leaves regeneration zone 14 with the flow of hot, compressed gas which flows from heat exchanger 18 to drying zone 8 via pressure conduit 15.

As an alternative to the shown embodiment, aftercooler 19 and cooler 23 can be integrated into one single element, so that only one physical cooler need be provided.

Figure 1B:
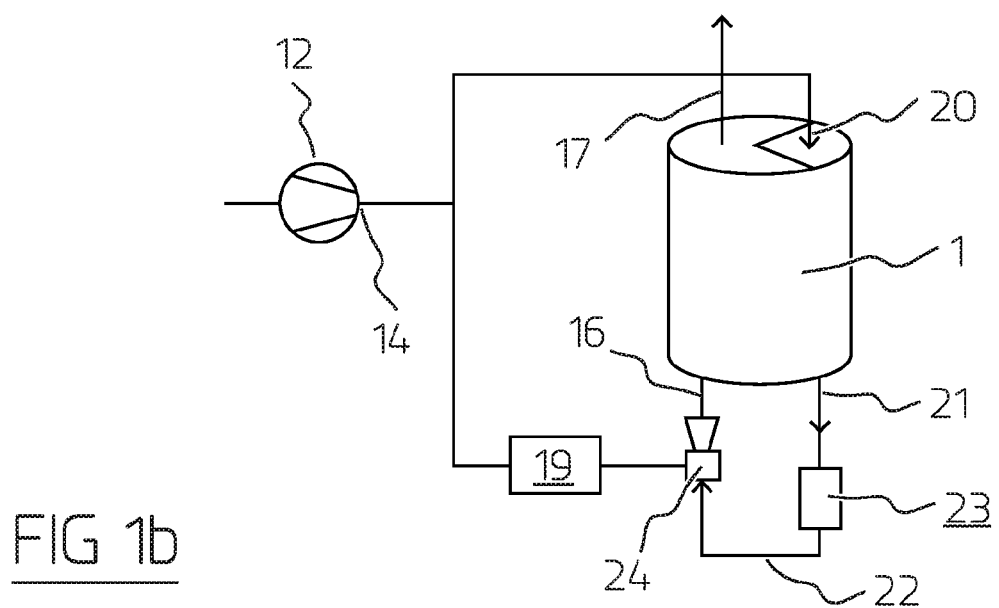
FIG. 1B shows an alternative schematic view of a compressor with a prior art drying device which is connected to a compressor element.

FIG. 1B shows an alternative manner of connecting a drying device 1 to a compressor element 12. FIG. 1B shows here a simpler construction in which outlet 14 for compressed gas is split, wherein part of the compressed gas is carried directly as regeneration gas to the second inlet 20 of drying device 1. Another part of the compressed gas is cooled in cooler 19 and carried to inlet 16 of the drying device in order to dry. Second outlet 21 of the drying device is also cooled in cooler 23 and combined via a venturi 24 or small compressor element 24 with the other part so as to be cooled.

Although the above described construction is advantageous, the skilled person will appreciate that drying device 1 can be integrated into a compressor in different ways for the purpose of drying compressed gas. The outlet of compressor element 12 can for instance be connected directly and fully, via a cooler, to first inlet 16 and be fully dried by drying device 1. An external airflow can here be connected to second inlet 20 in order to serve as regeneration flow.

Figure 2:
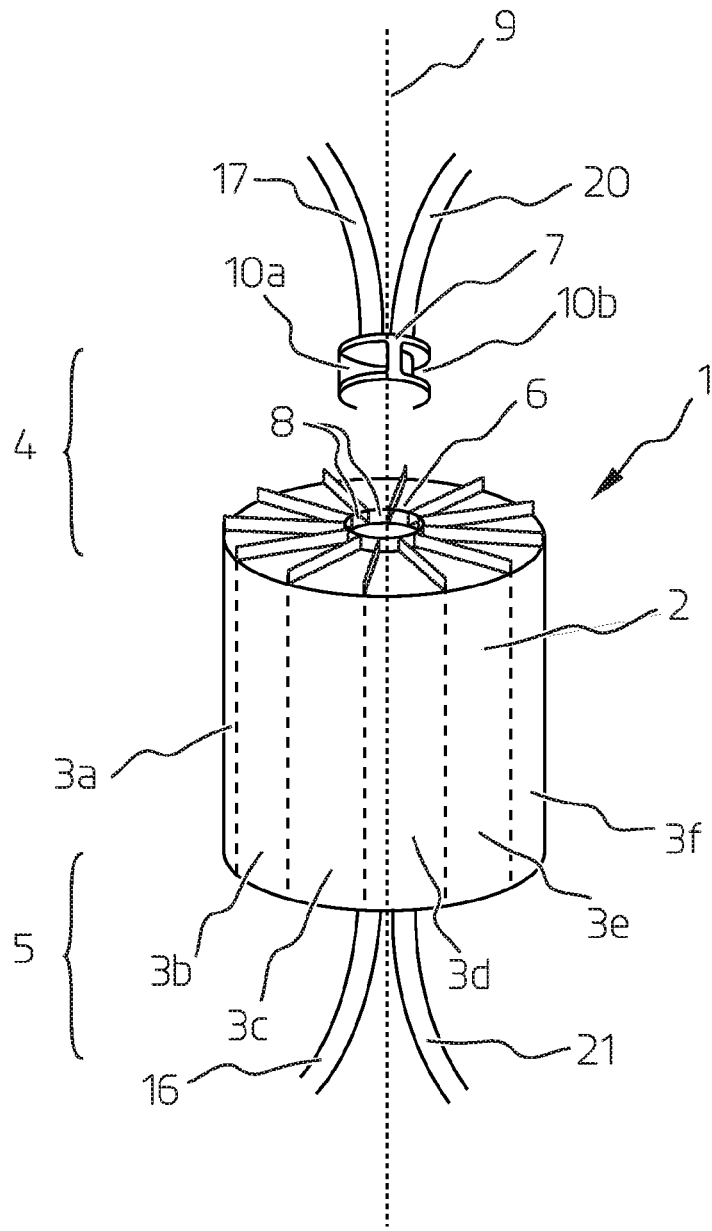
FIG. 2 shows a schematic exploded view of a drying device according to a preferred embodiment.

FIG. 2 shows drying device 1 in more detail. FIG. 2 more specifically shows the drying medium 2. The drying medium preferably has an internal structure with a plurality of narrow elongate small channels or tubes extending in the direction of axis 9. The walls of these elongate channels or tubes comprise a material with a predetermined desired energy and moisture absorption capacity. A large contact surface is hereby obtained between the air flowing through the drying medium and the material which provides for the energy and moisture exchange. The drying medium is typically formed such that adjacent elongate small channels or tubes are closed off from each other so that air cannot flow from one channel or tube to another channel or tube. In other words, air which flows into the drying medium in one small channel or tube will also flow out of the drying medium at the other end via this same channel or tube.

Irrespective of the form it takes, this drying medium is segmented into a plurality of drying segments 3. The number of segments is a minimum of six. In FIG. 2 the segments are designated with reference numerals 3a, 3b, 3c, 3d, 3e and 3f. About 25 segments are preferably provided. When the drying medium is cylindrical, each segment will preferably extend through about 15 degrees. It will be apparent that when the drying medium is formed with the above described internal structure, each segment 3 will have a plurality of small channels or tubes. The segmenting of drying medium 2 however also allows alternative configurations. Each segment can thus be formed in a separate housing, or a plurality of cavities can be provided in one housing.

When drying medium 2 is formed with an internal structure with a plurality of narrow elongate small channels or tubes, each channel or tube can per se be deemed a segment within drying medium 2, which then has a very large number of segments. However, by forming air chambers at a start and end of the elongate channels, these segments are functionally bundled together so as to form the above stated segments. The number of above stated segments is considerably smaller than the number of elongate channels or tubes.

Drying medium 2 extends between a first connecting end 4 and a second connecting end 5. Drying medium 2 preferably extends upward. In the embodiment of FIG. 2 the first connecting end 4 is formed at the top. In the embodiment of FIG. 2 the second connecting end 5 is formed at the bottom. At the position of connecting ends 4 and 5 airflows are controlled and distributed through drying medium 2. The first connecting end 4 therefore has first outlet 17 for the drying air flow and has second inlet 20 for the regeneration air flow. Second connecting end 5 has first inlet 16 for the drying air flow and has second outlet 21 for the regeneration air flow.

The airflows are distributed over segments 3. More specifically, the drying air flow and the regeneration air flow, and optionally also the cooling air flow, will be distributed over segments 3. The drying air flow will hereby flow from inlet 16 to outlet 17 and the regeneration air flow will flow from inlet 20 to outlet 21. The drying air flow and regeneration air flow preferably flow in opposite directions through drying medium 2.

For the purpose of distributing the airflows over segments 3 complementary concentric elements are provided at the position of first connecting end 4 and second connecting end 5. In FIG. 2 only the complementary concentric elements are shown at first connecting end 4. The skilled person will appreciate that the same or similar complementary concentric elements are provided at the position of second connecting end 5.

FIG. 2 shows the first concentric element 6. This first concentric element 6 takes a cylindrical form. A plurality of openings 8 is provided in first concentric element 6. These openings 8 are associated with the drying segments 3. More specifically, each drying segment 3 will be related to at least one opening 8 so that air which flows via this at least one opening 8 also flows through the respective drying segment 3. Openings 8 extend along a rotation ring around axis 9. First concentric element 6 also extends around axis 9.

FIG. 2 also shows the second concentric element 7. Second concentric element 7 is complementary to first concentric element 6. More specifically, second concentric element 7 can move relative to first concentric element 6 such that air can be distributed. In this embodiment the second concentric element also extends for this purpose around axis 9 with a diameter corresponding to that of first concentric element 6. Second concentric element 7 has channels 10 which are positioned along the rotation ring around axis 9. This rotation ring is the same as the rotation ring along which openings 8 are formed. This has the result that when concentric elements 6 and 7 are mounted, channels 10 open onto openings 8.

FIG. 2 shows two channels 10A and 10B. The skilled person will appreciate that a first channel 10A is related to the first airflow, the drying air flow, while the second channel 10B is related to the second airflow, the regeneration air flow. The two channels open along the rotation ring around axis 9 Channels 10A and 10B thereby connect first outlet 17 to a part of openings 8 and second inlet 20 to another part of openings 8 at the position of the first connecting end. Channels 10A and 10B thereby distribute the air from first outlet 17 and second inlet 20 to the openings. Because a similar or identical concentric element 7 is provided at the position of second connecting end 5, two airflows are formed which can flow through drying medium 2 and which are separated almost completely from each other. It will be apparent here that the majority of the components, including the drying medium and the first concentric elements 6, can take a static form, i.e. connected fixedly to a housing (not shown in FIG. 2).

Figure 3:
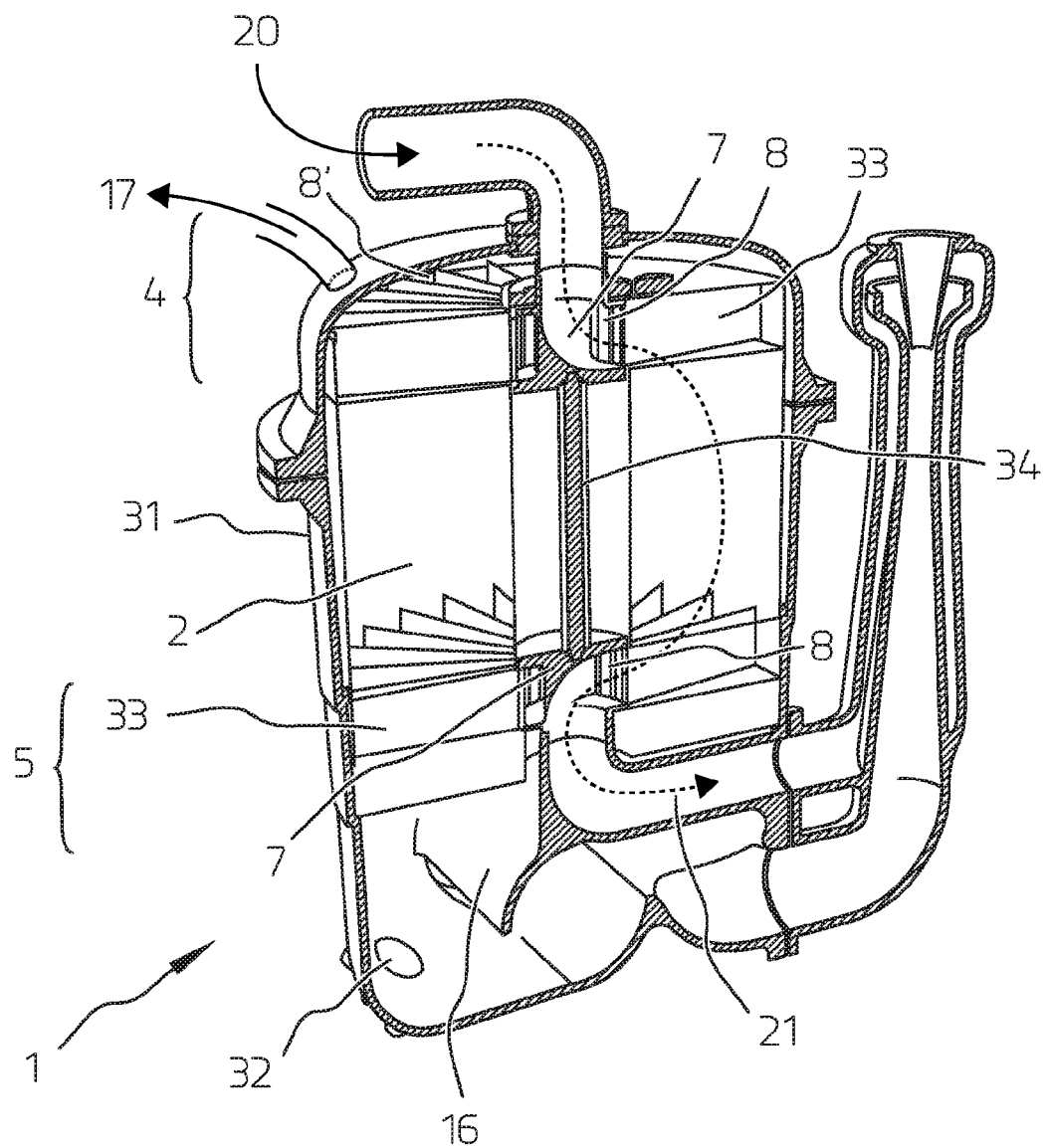
FIG. 3 shows a cross-section of a drying device according to a further embodiment.

FIG. 3 shows a practical embodiment of a drying device 1 according to an embodiment of the invention. The figure shows that drying medium 2 is provided in a housing 31. In the embodiment the housing is cylindrical. It will be apparent that, because drying medium 2 is provided fixedly in the housing, other forms such as a rectangular or segmented forms are also possible. Extending centrally through housing 31 is a shaft 34 which physically connects the second concentric element 7 of first connecting end 4 to the second concentric element 7 of second connecting end 5. Because of their physical connection, these second concentric elements 7 always rotate perfectly synchronously.

FIG. 3 shows that first inlet 16 is directly connected to second concentric element 7 so that air can flow through some of the openings 8 at the position of first connecting end 4. This air flows through drying medium 2 and at the position of second connecting end 5 is carried through openings 8 and second concentric element 7 to the second outlet. In this way an air flow can be carried through the drying medium, more specifically through the second concentric elements 7 and a limited number of segments.

Air chambers 33 are provided in order to allow air to flow to all small channels or tubes of a segment of drying medium 2. The air chambers extend from the transverse surface of the respective segment of the drying medium to the at least one related opening. From openings 8, the air chambers extend at least partially radially in order to allow air to flow from the openings, which are formed in the first concentric elements with a small cross-sectional area, to the drying medium, which has a considerably larger cross-sectional area. Cross-sections are seen perpendicularly of axis 9. The air chambers thereby provide for a spreading of the air over the whole drying medium. Each air chamber is preferably related to one drying segment 3. A drying segment 3 can also be related to a plurality of air chambers, for instance when a drying segment 3 also has a plurality of openings 8.

FIG. 3 further illustrates that openings 8 lie not only on a cylindrical surface, designated with reference numeral 8, but can also lie in a surface perpendicularly of axis 9, designated with reference numeral 8'. Each air chamber 33, and with this also each segment 3, is thereby associated with a first opening 8 and a second opening 8'. These further openings 8' are covered at least partially by a cover plate 35 which forms part of second concentric element 7. Second openings 8' form part of first concentric element 6. Second openings 8' open at the position of a rotation ring which is considerably larger than the rotation ring of first openings 8. It will be apparent to the skilled person that first and second concentric elements 6 and 7 are still complementary and are also still concentric. In this context concentric is defined as: elements which do not cross each other and which are constructed around the same axis. Complementary is related to the functionality and defined as: co-acting so as to separate airflows from each other. The concentricity allows elements 6 and 7 to be rotated relative to each other about axis 9.

In the embodiment of FIG. 3 the two concentric elements 7 will delimit the channels from each other, but the second concentric elements 7 will not necessarily comprise the two channels. This is because a first channel will run through the second concentric elements 7. This first channel opens onto the first openings 8, while the cover plate covers the associated second openings 8'. A delimiting is thus realized by the second concentric elements 7 of air chambers 33, and thus also segments 3, which are associated with openings 8. More specifically, the second concentric elements 7 will delimit these segments by isolating these segments relative to a surrounding area. The first channel can thus be formed through the second concentric elements 7 and the segments connected thereto, while the second channel is formed around the second concentric elements 7. In this embodiment the openings which are connected to the first channel will be referred to as a first selection of the openings and the openings which are connected to the second channel will be referred to as the second selection of the openings. The second concentric elements comprise a channel which opens onto the first openings of the first selection, while the cover plate covers the second openings of the first selection. The second concentric elements are also formed so as not to cover the second openings of the second selection and so as to cover the first openings of the second selection. It will be apparent that both for covering the second openings of the first selection and for covering the first openings of the second selection it is not necessary for the openings to each be closed individually, although it is necessary for the openings to be screened off together from the other channel so that air from the first channel cannot flow to the second channel and vice versa.

In the embodiment of FIG. 3 the connecting of the channels is simple, and as follows. At the top and the bottom the second concentric element can be directly rotatably connected to an inlet 20 and an outlet 21 of regeneration air. By rotating the second concentric elements the regeneration air is carried alternately through different segments of the drying medium. Housing 31 can be provided at the top and bottom of an outlet 17 and an inlet 16 so that the second airflow can flow around the second concentric elements. In other words, the second concentric elements screen a zone of the drying medium in order to allow a regeneration flow to flow in opposite direction to the drying flow. The drying flow runs through the housing of the drying device through the segments via openings 8', with the exception of the segments which are covered by the second concentric elements.

Figure 4A:
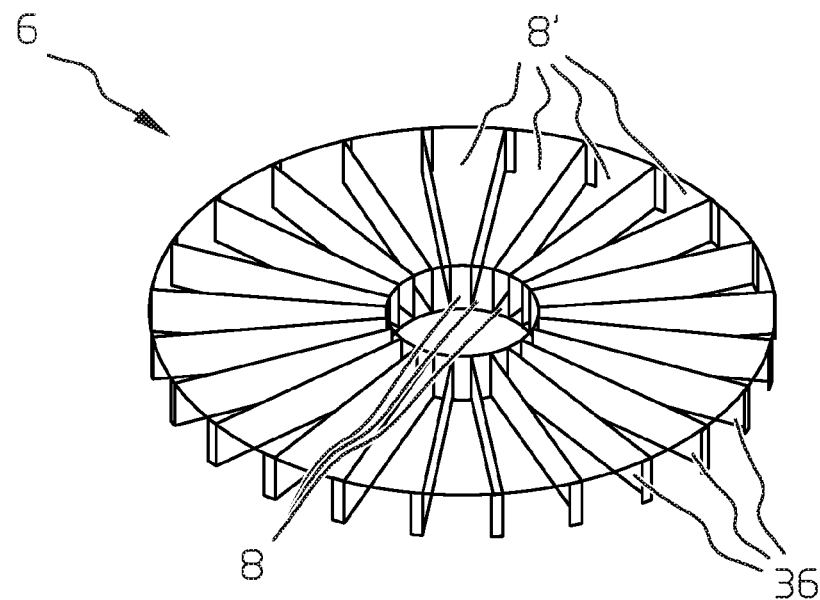
FIG. 4 shows a perspective view of complementary concentric elements.
Figure 4B:
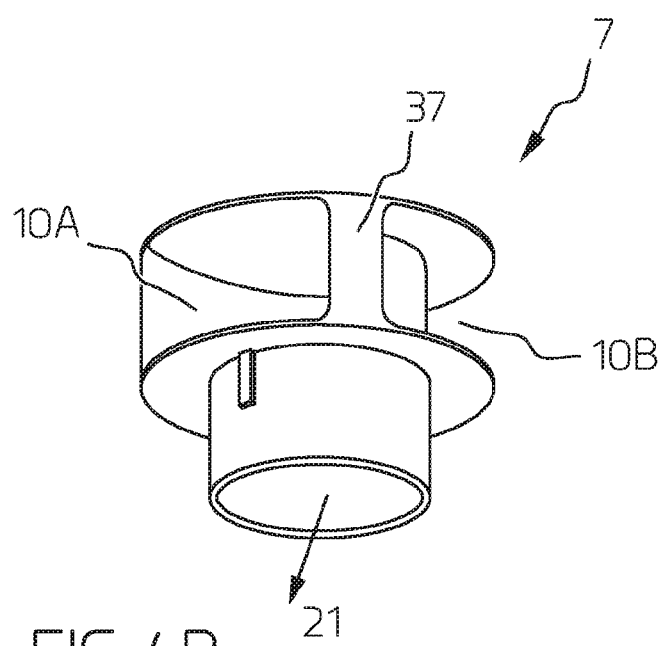

FIG. 4 shows an embodiment of complementary concentric elements. More specifically, FIG. 4A shows the first concentric element and FIG. 4B shows the second concentric element. The first concentric element of FIG. 4A is cylindrical in a central zone and has openings 8 which extend along the cylinder surface. The skilled person will appreciate that the cylinder form is just one embodiment, and that other forms, such as a cone form, optionally truncated, can also be applied. Further shown in the embodiment of FIG. 4A are segmenting walls 36. Segmenting walls 36 extend radially from the central zone of first concentric element 6. When a drying device 1 is constructed as shown in FIG. 3, segmenting walls 36 extend to a diameter which is substantially equal to the diameter of the drying medium. Segmenting walls 36 form the air chambers 33 for distributing air over all small channels or tubes of drying segment 3. Segmenting walls 36 are placed at least against drying medium 2, preferably partially into drying medium 2. This guarantees the sealing of air between segmenting walls 36 and the material of the drying medium. Placing segmenting walls 36 partially into drying medium 2 makes it possible to still make reliable use of the drying medium 2 with a finish which is rough and not perfectly smooth. When drying medium 2 rotates relative to air distributors, as in the prior art, it is essential for drying medium 2 to have a very smooth finish.

The segmenting walls may be closed at the top (not shown) so that the air can be distributed only among the segments via openings 8. In the shown embodiment the segmenting walls are open at the top, so that further openings 8' are there formed in a surface substantially perpendicular to axis 9. The second concentric element then preferably comprises a cover plate which fits on further openings 8' so that some of the further openings 8' can be closed. Different airflows can hereby be carried to different segments.

FIG. 4B shows second concentric element 7. The second concentric element is cylindrical and has a diameter which is such that the second concentric element fits closely in the first concentric element 6. The length of second concentric element 7, measured in the direction of axis 9, is at least great enough to extend over substantially the whole first concentric element 6. In FIG. 4B the second concentric element 7 has two channels 10A and 10B Channels 10A and 10B open onto different openings 8 when concentric elements 6 and 7 are mounted. FIG. 4B shows a boundary surface between channels 10A and 10B. This boundary surface forms the channel border 37 and separates the two channels 10A and 10B from each other at the position of the rotation ring. Channel border 37 has a width which is preferably at least as great as, preferably slightly greater than the width of openings 8. A channel border 37 with such a width prevents the first channel 10A and the second channel 10B from opening onto the same opening 8. In FIG. 4B first channel 10A is connected to the pipe which forms second outlet 21. A cover plate (not shown in FIG. 4B) will typically extend in radial direction at the position of first channel 10A so as to close the further openings 8'. The first airflow and second air flow can thus be separated from each other in simple manner by the two complementary concentric elements 6 and 7.

Figure 5:
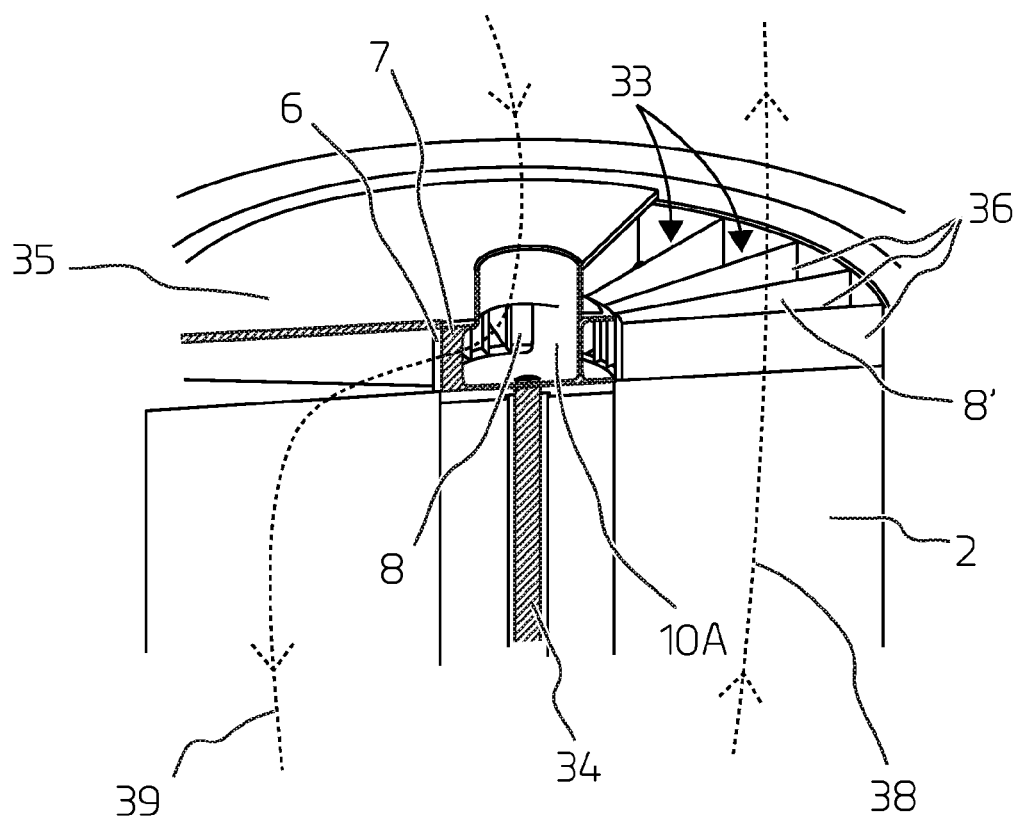
FIG. 5 shows a connecting end of a drying device.

FIG. 5 shows a detail of an embodiment of the first connecting end of a drying device and illustrates how the complementary concentric elements co-act in order to separate two airflows from each other in a drying medium 2. FIG. 5 shows the drying medium 2 and shows how the segmenting walls 36 form air chambers 33 at the top. FIG. 5 also shows that air chambers 33 have openings 8 in a central zone and have further openings 8' at the top. On the left side of the figure the further openings 8' are closed by the cover plate. Air of a second airflow 39 can flow through channel 10A through a portion of the segments 3. More specifically, the second airflow 39 flows through the segments which are related to the openings 8 onto which channel 10A open. The air chambers related to these segments are closed at the top by cover plate 35. The first airflow 38 flows through further openings 8', which are not closed on the right-hand side of the figure. The skilled person will appreciate that the first airflow 38 does not flow to any noticeable extent through openings 8, but does flow through the further openings 8'. The openings 8 which are related to the segments through which the first airflow 38 flows can therefore be closed. In this embodiment the drying medium 2 and the first concentric element 6 comprising openings 8, further openings 8' and segmenting walls 36 preferably take a static form. This means that the latter stated elements are connected fixedly to the housing. In this embodiment the second concentric element 7, which comprises channels 10A and cover plate 35, can rotate. In order to synchronize rotation of the second concentric element 7 of the first and second connecting end 4 and 5 a shaft 34, which mutually connects the second concentric elements 7, is preferably provided through drying device 1.

Figure 6:
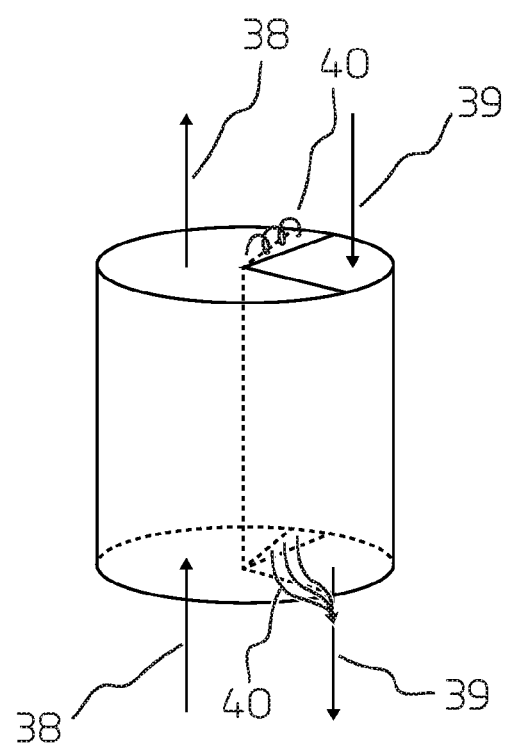
FIG. 6 shows a schematic view of the operation of the drying medium.

FIG. 6 illustrates the principle of a cooling air flow 40. Cooling air flow 40 forms a third airflow which, in addition to the first airflow 38 and the second airflow 39, flows through at least one segment of the drying medium. First airflow 38 is the drying air flow. Second airflow 39 preferably flows in opposite direction and is the regeneration air flow 39. By having part of the drying air flow flow back in at least one segment of the drying medium, cooling of this segment is achieved. The cooling air flow therefore preferably extends from an end of first airflow 38, where first airflow 38 leaves the drying medium, to the end of second airflow 39 to there be combined with the second airflow which leaves the drying medium. It is hereby not necessary to actively connect a third airflow to the concentric elements, but a cooling air flow can be obtained in the drying medium by predetermined synchronization and relative position of the channels at the position of the first and second connecting end 4 and 5. Tests have shown that providing a cooling air flow further increases the efficiency of the drying device.

Figure 7A:
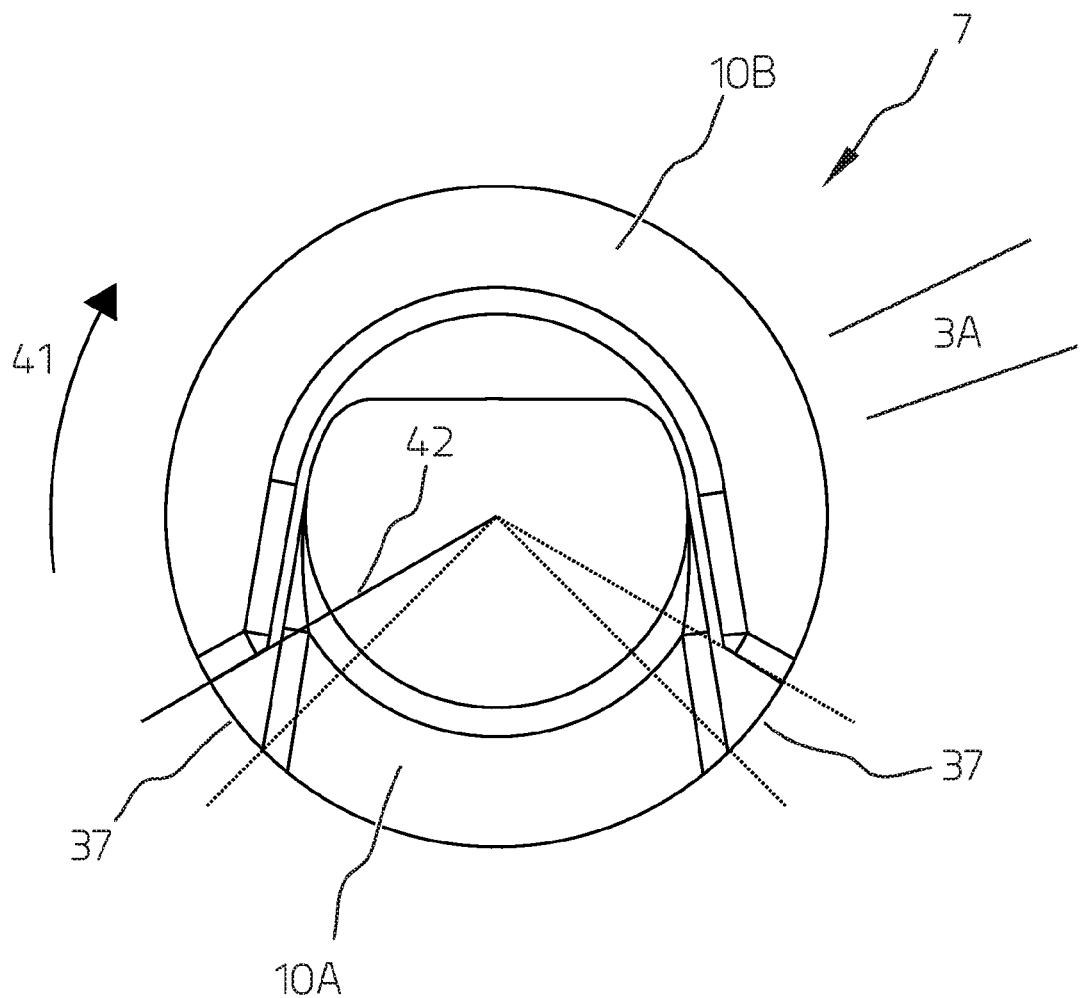
FIG. 7 shows a detail of the channels for distribution of air.
Figure 7B:
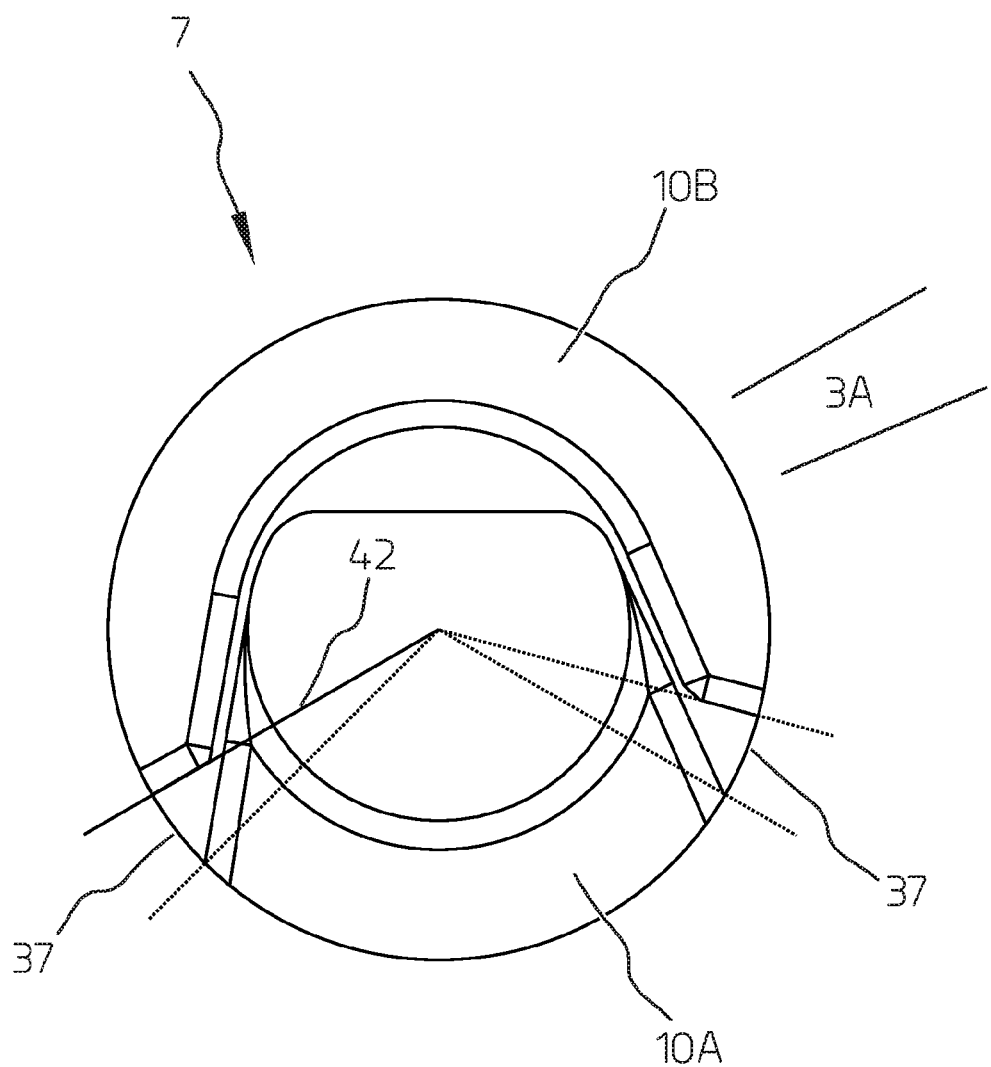

FIG. 7 shows a cross-section of second concentric element 7. FIG. 7A shows here the second concentric element at the position of first connecting end 4 and FIG. 7B shows the second concentric element 7 at the position of second connecting end 5. Concentric elements 7 of FIGS. 7A and 7B are not identical, but are compatible. More specifically, the sizes of channels 10A and 10B are not the same, whereby the above described cooling air flow will flow.

FIG. 7A shows a second concentric element 7 with a first channel 10A which extends through about 90 degrees. Second channel 10B extends through about 240 degrees. Formed between channels 10A and 10B are channel borders which extend through about 15 degrees.

FIG. 7B shows a second concentric element 7 with a first channel 10A which extends through about 105 degrees. Second channel 10B extends through about 225 degrees. Formed between channels 10A and 10B are channel borders which extend through about 15 degrees.

Where an indication is given above of the number of degrees, the word will be interpreted roughly as +/−20%, preferably as +1-15%, more preferably as +/−10%, most preferably as +/−5%. The skilled person will appreciate that this perceptual variation has to be chosen such that the total number of degrees of the different channels and borders amounts to 360 degrees.

FIGS. 7A and 7B show a line 42 as synchronization line for elucidating the operation of concentric elements 7. In mounted state and during operation of drying device 1 the synchronization lines extend parallel. The rotation direction is also shown in FIGS. 7A and 7B with arrow 41. FIG. 7 shows one drying segment 3A. This drying segment 3A extends from first connecting end 4 to second connecting end 5 and air can flow through this drying segment 3A. In the shown position the drying air flow will flow through drying segment 3A because drying segment 3A borders on second channel 10B at the position of both the first and the second connecting end 4 and 5. It is assumed here that the drying air flow flows through the second channels 10B in this embodiment. The skilled person will appreciate that when concentric elements 7 rotate, drying segment 3A is first closed off by channel border 37 and then borders on first channels 10A. At that moment, the regeneration air flow will flow through drying segment 3A. Because concentric elements 7 are not identical, drying segment 3A will first be closed off at the position of the first end by channel border 37, while the drying segment still borders on first channel 10A at the position of the second end. Drying segment 3A will then border on second channel 10B at the position of first connecting end 4, while the drying segment borders on first channel 10A at the position of second connecting end 5. At that moment a cooling air flow will begin to flow through drying segment 3A. This cooling air flow extends between the end of the drying air flow and the end of the regeneration air flow. When concentric elements 7 rotate further, the drying segment will be closed by the channel border at the position of second connecting end 5 so that the cooling air flow stops. The process then repeats itself again. The plurality of segments 3 will alternately be provided in the above described manner with a drying air flow, regeneration air flow and cooling air flow owing to the construction of channels 10A and 10B. The ratio of drying air flow, regeneration air flow and cooling air flow can be determined by the number of segments and by the construction of the second concentric elements.

It will be apparent that the rotation direction shown in FIGS. 7A and 7B and used above in the accompanying elucidation may not be interpreted as limitative, and that is possible to rotate concentric elements 7 in multiple directions. It will also be apparent that the rotation speed can vary on the basis of the airflow rate flowing through drying device 1 and on the basis of the temperatures of flows 38 and 39.

Figure 8:
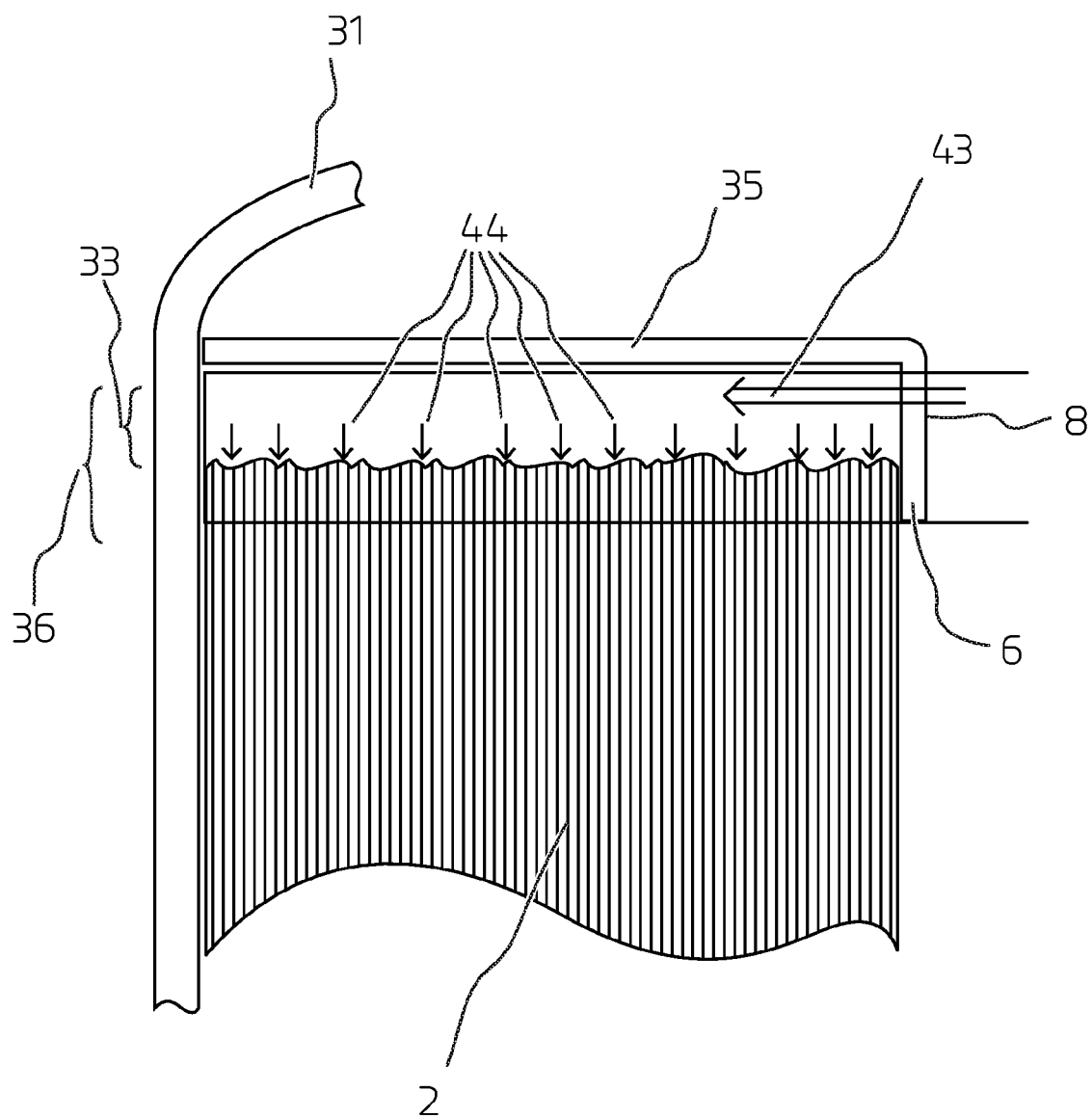
FIG. 8 shows a cross-section of a first connecting end according to an embodiment.

FIG. 8 shows a cross-section of a portion of the first connecting end 4 of a drying device 1. This FIG. 8 illustrates how air chamber 33 is formed above drying medium 2. Drying medium 2 comprises small channels and/or tubes which extend in upward direction. On the upper side, drying medium 2 may have some unevenness or a rough finish. Segmenting walls 36 are pressed at least partially into drying medium 2. In FIG. 8 about $\frac{1}{3}^{rd}$ of segmenting wall 36 has been pressed into drying medium 2. Segmenting walls 36 are however flat at the top, so that a cover plate 35 can connect closely against the walls so as to optimize sealing. FIG. 8 illustrates how air chamber 33 is used to distribute air coming from opening 8, and designated with arrow 43, among the small channels and/or tubes of the drying medium, designated with arrows 44. The skilled person will appreciate that an airflow in the opposite direction can be facilitated in similar manner.

By pressing segmenting walls 36 at least partially into the drying medium on either side of drying medium 2, drying medium 2 can be sub-divided into drying segments 3 and air can be carried via openings 8 selectively from and to the drying segments 3.

Figure 9:
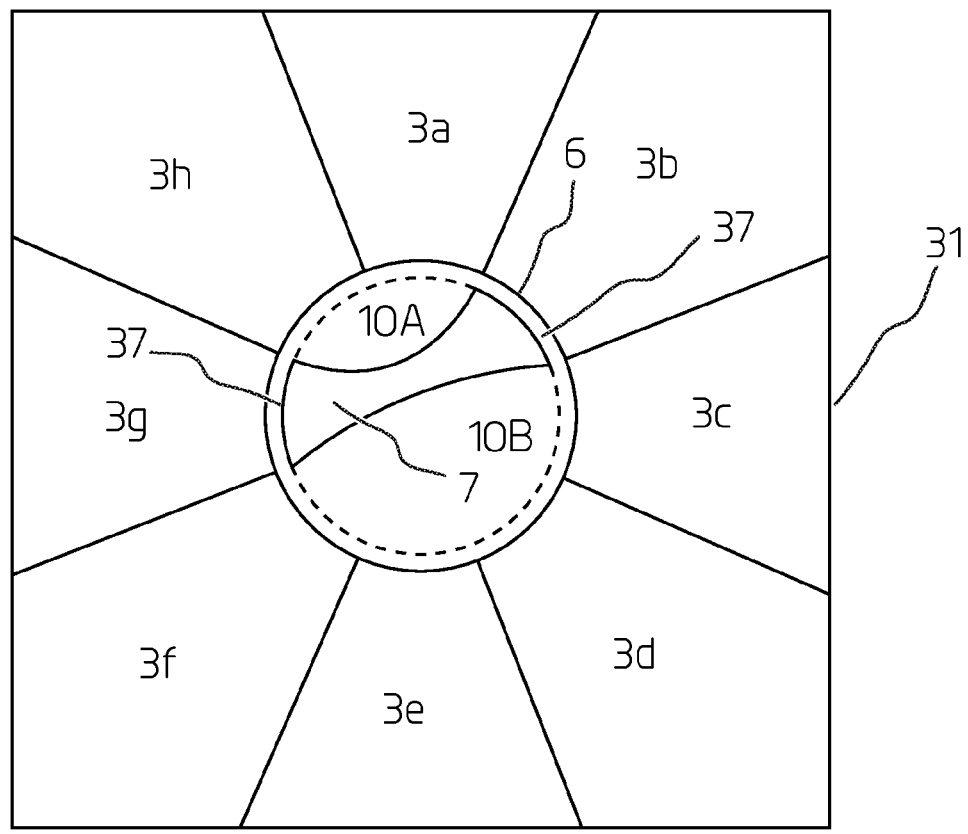
FIG. 9 shows a top view of a first connecting end.

FIG. 9 shows a top view of an alternative embodiment of a drying device. In this embodiment drying medium 2 is provided in a rectangular housing 31 and the drying medium comprises eight segments 3a-3h. The segments have in cross-section a substantially equal surface area, whereby segments in corners of the rectangle, 3b, 3d, 3f and 3h, are narrower than other segments 3a, 3c, 3e and 3g. Each segment is related to an opening in first concentric element 6. This first concentric element 6 is compatible with a second concentric element 7. The second concentric element 7 is rotatable in the first concentric element 6 and has two channels 10A and 10B. In the position as shown in FIG. 9 first channel 10A is connected to segments 3a and 3h. Second channel 10B is connected to segments 3c, 3d, 3e and 3f. Segments 3b and 3g are closed off by channel borders 37. Openings 8 are preferably the same size as channel borders 37 so that a channel border 37 can completely close an opening. In FIG. 9 the first concentric element 6 is provided centrally in the drying device. It will be apparent that the first concentric element 6 can also be placed decentrally.

Figure 10:
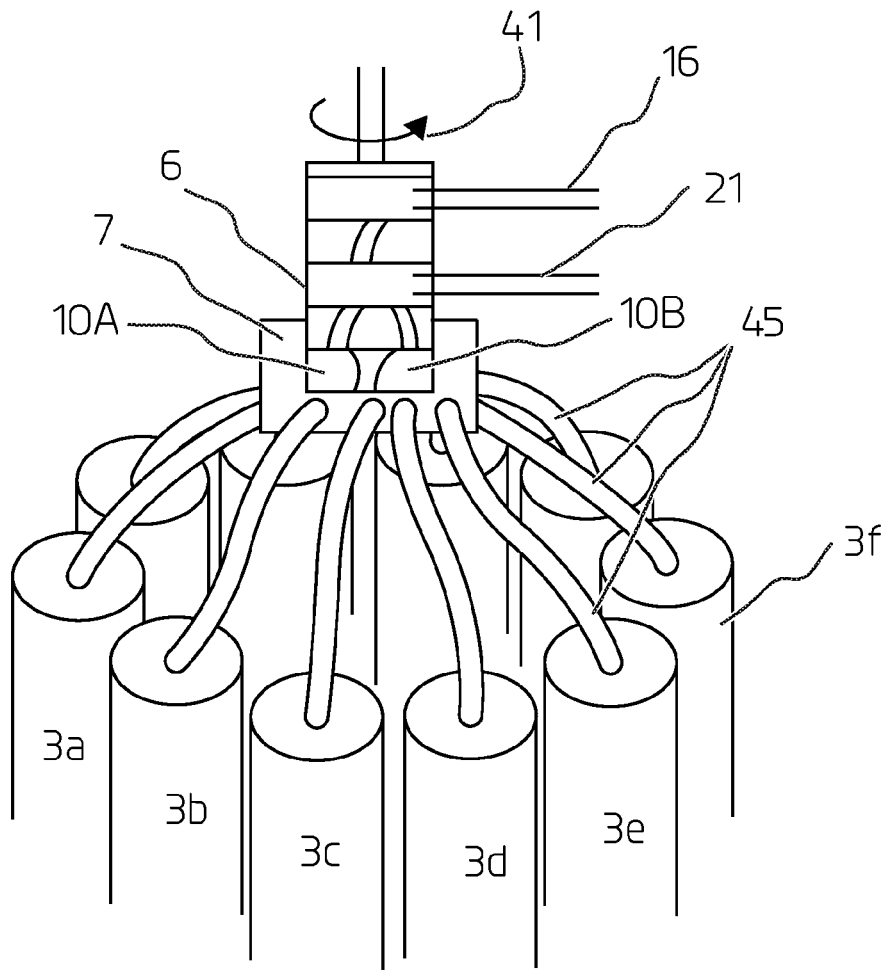
FIG. 10 shows a further alternative embodiment of the drying device according to the invention.

FIG. 10 shows an embodiment in which each drying segment 3 is formed separately and has its own housing. Each drying segment 3 is here connected via a connection 45 to the second concentric element 7. The second concentric element has openings 8 (not shown in FIG. 10) to which connections 45 are connected, such that when air flows through the openings, this air can flow through the respective drying segments 3. Because each drying segment 3 has its own housing, leakage of air from the one to another segment is almost impossible. This allows a cheaper drying medium to be provided, for instance a chamber with granules, the surfaces of which have predetermined properties.

FIG. 10 further shows how the first concentric element can be constructed with two connections 16 and 21, wherein the first concentric element can be designed internally such that first channel 10A is always connected for throughflow to connection 16, while second channel 10B is always connected for throughflow to connection 21. Such an internal design is described in U.S. Pat. No. 7,077,187 and is included here by way of reference.

Figure 11:
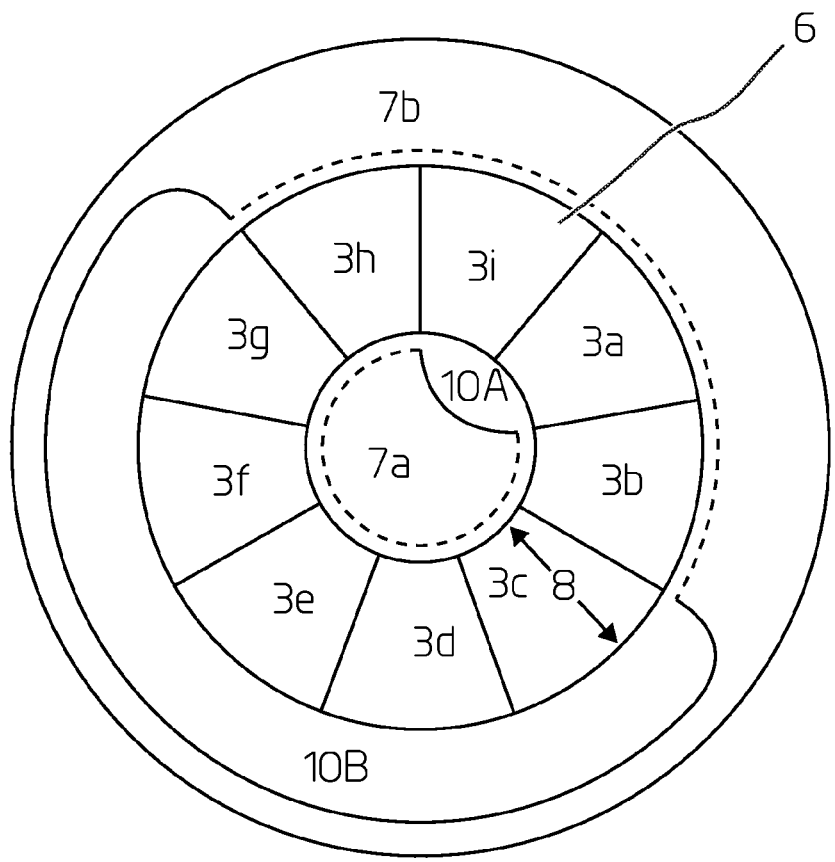
FIG. 11 shows an alternative embodiment of complementary concentric elements.

FIG. 11 shows an alternative embodiment of the concentric complementary elements 6 and 7. In the shown embodiment second concentric element 7 is constructed from two parts 7a and 7b. First part 7a is situated inside first concentric element 6 and has a first channel 10A which is directed toward openings 8 at the position of the inner border of first concentric element 6. Second part 7b lies outside first concentric element 6 and has a second channel 10B which is directed toward openings 8 at the position of the outer border of first concentric element 6. Air can be distributed over the segments 3 via such complementary concentric elements 6 and 7.

The skilled person will appreciate on the basis of the above description that the invention can be embodied in different ways and on the basis of different principles. The invention is not limited here to the above described embodiments. The above described embodiments and the figures are purely illustrative and serve only to increase understanding of the invention. The invention is not therefore limited to the embodiments described herein, but is defined in the claims.

The invention claimed is:

1. A drying device comprising a drying medium with a predetermined number of drying segments which extend adjacently of each other and are associated with at least one opening at each of a first connecting end and a second connecting end, wherein the predetermined number is greater than six and wherein each connecting end comprises first and second complementary concentric elements which are rotatable relative to each other round an axis, wherein the openings are provided in the first concentric elements along a rotation ring around the axis, wherein the second concentric elements each delimit at least two channels which open at the position of said rotation ring, so that corresponding channels of the first and second connecting end are connected to each other via the openings and the drying segments in order to allow a first airflow and a second airflow through the drying device.

2. The drying device according to claim 1, wherein formed in each of the second concentric elements is at least a first channel which opens at the position of said rotation ring onto a first selection of the openings in order to allow the first airflow through the first channel and the associated segments.

3. The drying device according to claim 2, wherein each of the second concentric elements is further formed so as to leave a second selection of the openings, differing from the first selection, open in order to delimit a second channel around the second concentric elements to allow the second airflow through the second channel and the associated segments.

4. The drying device according to claim 1, wherein each stated at least one opening comprises a first opening provided along the rotation ring and comprises a second opening provided along a further rotation ring, wherein the second concentric elements are formed to cover the second openings where a first channel opens onto the first openings and to leave the second openings open where the first openings are covered.

5. The drying device according to claim 1, wherein the openings have a substantially constant size and are situated at a substantially constant intermediate distance from each other along the rotation ring.

6. The drying device according to claim 1, wherein the drying segments and first concentric elements are provided statically and wherein the second concentric elements are rotatable.

7. The drying device according to claim 1, wherein the predetermined number is smaller than 50.

8. The drying device according to claim 1, wherein the second concentric elements are operatively connected for rotating synchronously relative to the first concentric elements.

9. The drying device according to claim 8, wherein the operative connection is formed by a shaft which physically connects the second concentric elements to each other.

10. The drying device according to claim 1, wherein the two channels are provided for allowing the first airflow to flow through X segments and for allowing the second airflow to flow through Y segments, wherein X is greater than Y.

11. The drying device according to claim 1, wherein the drying device is provided for allowing the first airflow and the second airflow in opposite directions.

12. The drying device according to claim 11, wherein the device is formed to allow a third airflow which extends between an end of the first airflow on the one side and an end of the second airflow on the other.

13. The drying device according to claim 10, wherein the two channels are provided for allowing the third airflow to flow through Z segments, wherein Z is smaller than Y.

14. The drying device according to claim 1, wherein each drying segment has an air chamber on either side of the drying medium in order to distribute air among the at least one opening and the drying medium.

15. A compressor for compressing a gas, which compressor is provided with at least one compressor element with an outlet for compressed gas, wherein said outlet for compressed gas is connected to the drying device according to claim 1.

16. The drying device according to claim 1, wherein the predetermined number is smaller than 40 and greater than 15.

17. The drying device according to claim 1, wherein the predetermined number is smaller than 30 and greater than 20.

* * * * *